United States Patent [19]

Tucker

[11] 4,136,431

[45] Jan. 30, 1979

[54] APPARATUS AND METHOD FOR INSERTING INDICIA INTO PENS

[76] Inventor: Percy A. Tucker, 3401 Markview Ct., Richmond, Va. 23234

[21] Appl. No.: 821,055

[22] Filed: Aug. 1, 1977

[51] Int. Cl.$^2$ .......................... B23P 19/04; B31B 43/00

[52] U.S. Cl. .......................................... 29/451; 29/234; 29/280; 29/282; 93/36.01; 93/77 CL

[58] Field of Search .................. 29/451, 234, 235, 244, 29/278, 280, 282; 93/36.01, 77 CL, 94 M

[56] References Cited

U.S. PATENT DOCUMENTS

| | | | |
|---|---|---|---|
| 1,739,270 | 12/1929 | Thiry | 29/235 |
| 1,803,491 | 5/1931 | Thiry | 29/235 |
| 1,945,243 | 1/1934 | Watkins et al. | 93/36.01 |
| 2,350,574 | 6/1944 | Tienken, Jr. et al. | 93/94 M |
| 2,492,227 | 12/1949 | Korecky | 29/451 |
| 2,632,236 | 3/1953 | Dodge | 29/235 |
| 2,647,556 | 8/1953 | Courtney | 29/451 |
| 2,690,001 | 9/1954 | Cowles | 29/235 |
| 2,698,478 | 1/1955 | Heisterkamp et al. | 29/235 |
| 2,699,600 | 1/1955 | Korecky | 29/235 |
| 2,797,471 | 7/1957 | Hamberger | 29/278 |
| 2,871,553 | 2/1959 | Binder | 29/451 |
| 3,220,100 | 11/1965 | Christensen | 29/244 |
| 3,624,884 | 12/1971 | Scime | 29/280 |
| 3,825,985 | 7/1974 | Meitinger | 29/451 |

*Primary Examiner*—C. W. Lanham
*Assistant Examiner*—Daniel C. Crane
*Attorney, Agent, or Firm*—Dowell & Dowell

[57] ABSTRACT

An apparatus for simultaneously forming generally flat sheet material having indicia thereon into a tubular shape and inserting the sheet material into the transparent or translucent barrel of a pen or mechanical pencil in such a manner that the indicia carried on the sheet is visibly displayed through the wall of the barrel.

13 Claims, 7 Drawing Figures

APPARATUS AND METHOD FOR INSERTING INDICIA INTO PENS

BACKGROUND OF THE INVENTION

1. Field of the Invention

This invention relates generally to pens or other writing implements carrying display indicia and particularly to an apparatus for inserting a generally rectangular flat display sheet into the hollow barrel of the implement to form a generally cylindrical display surface which is viewable through the barrel of the implement.

2. History of the Prior Art

It has long been known to use pens, pencils and other writing implements as vehicles for the visual communication of various advertising, personal, business, political, social, or similar identifications, slogans, messages, data, and other such information.

Such visual display writing implements have been designed and produced in numerous ways in order to achieve the aforementioned desired effect and have been made available in various price ranges depending upon the ultimate purpose for which the implement is desired. For instance, some pens have been provided with intricate calendars, conversion tables and the like which may be rotatably adjusted with the pen housing. Other pens, which are more or less designed as novelty items, may carry a written message or picture which is viewable through a portion of the pen barrel and which may, if desired, be provided with some means to animate the picture or move the message relative to the barrel.

Some of the greatest uses of visual display, however, have been in the area of personal or business identifications and as a form of advertising. The use of such a form of communication has met with much success due to the fact that the visual display is carried by an implement which is an integral part of people's daily personal and business activities. That is, since the demand for pens, pencils and other writing implements is already great, the inclusion of some visual indicia simply provides an added benefit by either identifying one's property or to communicate some message to those who will make use of the implement.

Another reason for the success of some visual display pens and pencils is due to the fact that the costs of the more simplistic or basic pens or pencils have been maintained at a relatively affordable level due to current mass production techniques.

In order to maintain prices for some visual display or personalized pens and pencils at a price which is competitive with pens and pencils not having such indicia, it has been necessary to increase the use of less expensive forms of visual display which have the disadvantage of not being as neat and professional in appearance nor as long lasting as is possible.

For instance, the prior art discloses numerous pens having different means for either mounting the visual display or identification within a transparent barrel of a pen or printing, stamping or otherwise affixing some indicia to the exterior surface of the pen. The techniques of stamping or printing the exterior of the barrel have not been found to be completely satisfactory in that any lettering or other material along the exterior of the barrel is subjected to constant wear and thus frequently rubbed, peeled or scratched from the pen's surface.

In order to insure that the printed material will continue to be legible, some manufacturers have used paper inserts which are wrapped about a plastic or cardboard tube and the tube and paper insert subsequently introduced within the barrel of the pen. In this manner, the paper is held between the barrel and the tube.

U.S. Pat. No. 3,077,691 to Shea discloses a method of mounting the display interiorly of the pen barrel. In Shea a preformed indicia carrying tube is inserted into the transparent barrel of a pen. In order to place a display within the pen, the indicia carrying material must therefore be either printed and rolled into a tubular shape or be preformed as a hollow tube and subsequently printed prior to insertion into the pen barrel.

Thus, each of the foregoing examples of placing the display inside the tube has required a relatively rigid tubular member to be used in the pen and such added structure increases both material handling and costs.

To overcome some of the above problems, British Pat. No. 695,363 to Smith discloses a pen in which the insert is freely maintained within the barrel of the pen after being initially scrolled into a tubular shape and inserted therein. The paper or similar material is held in position simply by its inherent physical characteristics of trying to assume its previous flat or natural planar shape or configuration. Although the use of a singular indicia carrying element which need not be performed into a continuous or rigid cylinder reduces the cost, the scrolling or rolling of the material and subsequent insertion of the material into the barrel of an implement creates substantial handling, aligning, and inserting problems.

Other examples of the prior art include: French Pat. No. 1,095,468, U.S. Pat. Nos. 1,255,134 to Casey, 2,350,574 to Tienken, Jr. et al. and 3,828,415 to Kammeraad, et al.

SUMMARY OF THE INVENTION

The present invention is embodied in an apparatus for inserting a generally flat indicia carrying relatively flexible sheet into a transparent or translucent tubular member and particularly the barrel of a pen or similar writing implement. The apparatus includes a sheet material support member having a channeled feed chute along which the indicia carrying material is initially formed into a U-shape by a mandrel pressing the sheet material into the feed chute. Thereafter, the mandrel is moved axially to push the sheet material into and through a forming guide having a bore with a frustoconical forming portion at one end and a centering portion at the opposite end. The large open end of the hollow tubular barrel of a writing implement is received within the centering portion of the forming guide and is releasably held in axial alignment with the bore by a slide member which normally is urged toward the forming guide by a spring or other resilient member acting against a fixed stop. It is contemplated that the apparatus of the present invention may be operated either manually or automatically.

It is an object of this invention to provide an apparatus for inserting precut and preprinted flat stock indicia carrying material into the barrel of a pen, pencil or similar implement to form a display visible exteriorly of the barrel.

It is another object of this invention to provide an apparatus for manufacturing display type pens, pencils and similar implements in which the indicia carrying material is simultaneously formed into a generally cylindrical shape as it is fed into the bore of the implement barrel.

It is a further object of this invention to provide an apparatus for manufacturing display pens, pencils and the like in which a relatively flat indicia carrying material such as paper, flexible plastic or other sheet material may be quickly and easily inserted into the bore of the pen or pencil wherein the material is viewable as a display cylinder.

It is another object of this invention to provide a cylindrical display within the hollow barrel of a pen, pencil or the like in which the indicia carrying material may be inserted therein without the aid of secondary support cylinders or without requiring the material to be performed into a tubular shape.

It is a further object of this invention to provide an apparatus for inserting a generally flat indicia carrying material into the barrel of a pencil, pen or the like in which the material is simultaneously formed into a cylindrical shape and inserted into the bore of the barrel and is positively urged during the forming operation by means of a stepped mandrel which is designed to insure that the material is appropriately situated within the barrel.

It is also an object of this invention to provide a low cost means for manufacturing display type pens, pencils and other similar implements in which the display portion of the implement consists of a clear or transparent barrel and a singular non-continuous interior liner.

It is another object of this invention to provide an apparatus for inserting display material into the hollow barrel of a pen or similar implement in which the barrel is automatically aligned or centered with respect to the inserting mechanism as it is supported relative thereto.

DESCRIPTION OF THE PREFERRED EMBODIMENT

Figure 2:
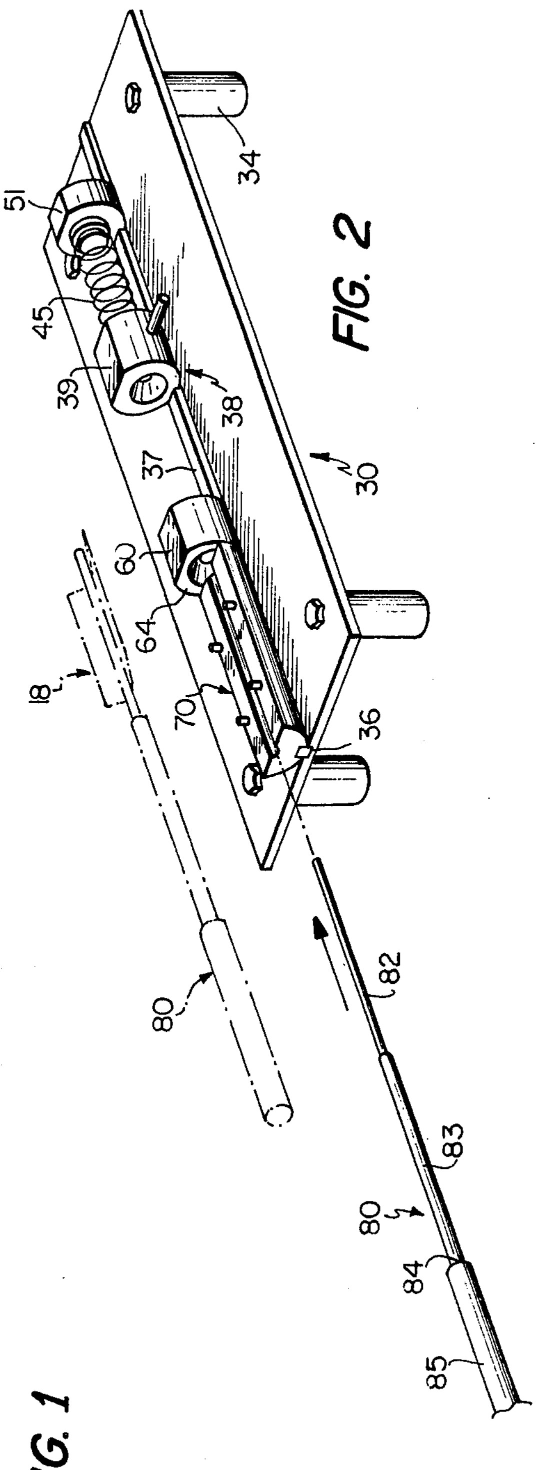
FIG. 2 is a perspective view of the indicia inserting apparatus.
Figure 7:
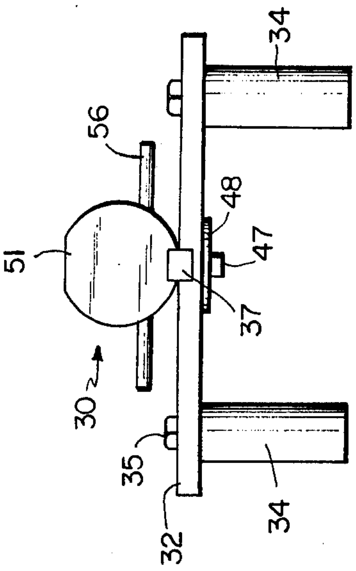

With continued reference to the drawings, a visual display pen 10 is shown as manufactured and assembled in accordance with the present invention. The display pen 10 includes a cap 11, barrel 12, cartridge 13, cartridge tip guide 14, push button 15, spring 16, pocket clip 17, and a strip of indicia carrying sheet material or liner 18. The pen may be constructed of any conventional material, however, the barrel 12 should be at least partially formed of a light transmitting transparent or translucent thermoplastic material or the like.

The barrel normally has a generally cylindrical cross-section with a gently curved or tapered outer wall 19 from its larger rear or threaded end 20 toward the generally pointed front or writing end 21. Such barrel is hollow and includes a bore 22 and a counterbore 23 which are connected by a shoulder portion 24 which defines the seat for the spring 16, tip guide 14, and the display material 18.

In order to simplify and minimize the effort necessary to insert the strip of display material into the barrel of a pen or similar article, the material forming and inserting apparatus 30 of the present invention is constructed so as to enable the strip of sheet material 18, which is initially relatively flat and rectangular, to be simultaneously shaped and fed into the proper display position with the barrel. The forming and inserting machine or apparatus 30 includes a generally planar base plate 31 having upper and lower surfaces 32 and 33. The base plate 31 is supported or elevated from a support surface by a plurality of legs 34 which are suitably secured thereto, such as by bolts 35.

An elongated groove 36 is provided generally centrally and along the length of the base plate 31. An elongated guide bar 37 of rectilinear cross-section is fixedly secured within the U-shaped groove or channel 36 and extends along the length thereof. The guide bar 37 is elevated with respect to the upper surface 32 of the base plate 31 so as to provide a positive guide or track for aligning the operable components of the apparatus, as will hereinafter be described.

Mounted along one side of the upper surface of the base plate is a barrel or similar tubular article supporting or clamping member 38. The article supporting member includes a reciprocating traveling or clamping block 39 which is disposed to move along and be positively guided by the guide track 37. The reciprocating support block 39 has a beveled opening or centering portion 40 disposed in the front portion or face 41 thereof. The rear surface or face 42 is provided with a pair of concentric circular protrusions 43 and 44 which are of varying diameter and which define a seat for one end of a spring member 45. The traveling or reciprocating clamping block is positively secured from movement away from the base plate by a guide screw 46 which extends from the traveling block downwardly through a slot 50 provided through both the guide bar 37 and base plate 31. The lower end of the guide screw has an enlarged head 47 which is prevented from being withdrawn through the slot by means of a washer 48 which is maintained in sliding engagement adjacent the lower surface 33 of the base plate.

The traveling or clamping block is urged toward one end of the slot 50 along the guide rail 37 by the spring 45. The opposite end of such spring is supported by an abutment or stop block 51 which is secured along the line of the channel or guide bar 37 as by a screw or screws 52. The other end of the spring is seated on a shoulder or flange formed by two generally circular concentric protrusions 53 and 54 which extend outwardly from the front face 55 of the stop block 51. It is noted that although a spring is shown for urging the traveling block to its forward position, other suitable devices, such as pneumatic cylinders, could be used to cause reciprocal movement of the traveling block.

Although the apparatus may be adapted to be mechanically or electrically operated and controlled, it is shown in the drawings as being hand operable. In this regard, handles 56 are provided which extend outwardly from both sides of the traveling block to assist in the manual rearward movement of the traveling block in compressing the spring 45.

In order to appropriately align a barrel of a pen, pencil or similar article with a strip of material which is to be inserted therein, a forming block or guide 60 is securely mounted along the guide bar 37 by the use of screws 59. The forming block is spaced from the front face of the traveling block a distance which is normally slightly less than the length of the barrel to be used or supported. A slot or groove 61 is provided along the lower portion of the forming block which groove permits the block to be cooperatively mounted along the length of the guide bar or rail so as to be in alignment with the traveling block.

The forming block has a bore 62 therethrough which extends from a large conically shaped opening or forming portion 63 which is disposed generally centrally of the front face 64 thereof to a second recess or tapered opening 65 in the central portion of the rear face 66 thereof. The opening 65 is of sufficient size to cooperatively receive the threaded open end portion 20 of the barrel 12. In this manner, a barrel which is to receive a sheet material display insert or liner is supported so as to be in alignment with the forming block bore 62 having the threaded end thereof engaging the forming block and the tip end 21 engaged within the beveled opening 40 and being compressed by the traveling block 39. The beveled configuration of the openings or centering portions 40 and 65 function to cause the tip and threaded end portion of the barrel to automatically be seated as the clamping block is urged toward the forming block so that the counterbore 23 of the barrel is in axial alignment with the bore 62 through the forming block. In this regard, instead of utilizing the beveled recessed openings to align the barrel relative to the bore of the forming block, other suitable aligning structures, such as outwardly extending annular flanges or fingers, could be used, although such structures are more complicated and therefore not as desirable as the preferred structure.

Figure 6:
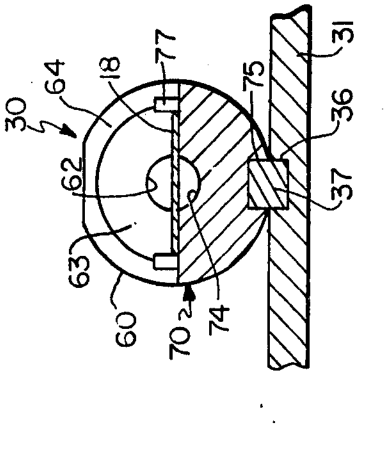
FIG. 6 is an enlarged section along the line 6—6 of FIG. 7 is an end elevational view of the right side of FIG. 4.
Figure 1:
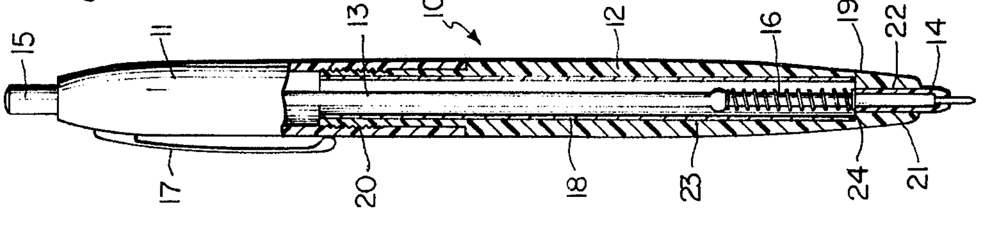
FIG. 1 is a partial cross-section of a pen showing the display material inserted and positioned by use of the present invention.

A feed assembly for the strip of sheet material is shown in FIGS. 2 through 6 and consists of a feed guide 70 which has a generally planar upper surface 71 and front and rear faces 72 and 73, respectively. A semicircular guide channel 74 is disposed along the planar upper surface of the guide 70. A slot or channel 75 is also provided along the lowermost portion of the guide and cooperatively engages the guide rail 37 so as to align the guide channel 74 with the bore 62 of the forming block 60. The feed guide 70 is secured in position with the rear end or face thereof adjacent to the forward face 64 of the forming block 60 by means of one or more screws 76. With particular reference to FIG. 6, it is preferred that the diameter of the feed guide slot or channel 74 be substantially equal to that of the bore 62 of the form block 60.

In order to properly position the sheet of material or liner 18 on the feed guide 70, a plurality of guide pins 77 are appropriately spaced along both sides of the guide channel 74. As shown in FIG. 6, the longitudinal center line of the sheet of material 18 is aligned with the forming portion 63 and bore 62 of the forming block and the sides of such sheet abut the guide pins 77 along each side of the feed guide so as to be maintained in alignment until being inserted into the forming block. Preferably, the strip of sheet material 18 has a length substantially equal to the length of the counterbore 23 and has a width substantially equal to the circumference of such counterbore. It is important that the mouth or outer periphery of the forming portion 63 of the forming block 60 be larger than the width of the strip of sheet material so that the sides of such strip are curled inwardly when the strip of material is inserted into the hollow barrel 18.

Figure 3:
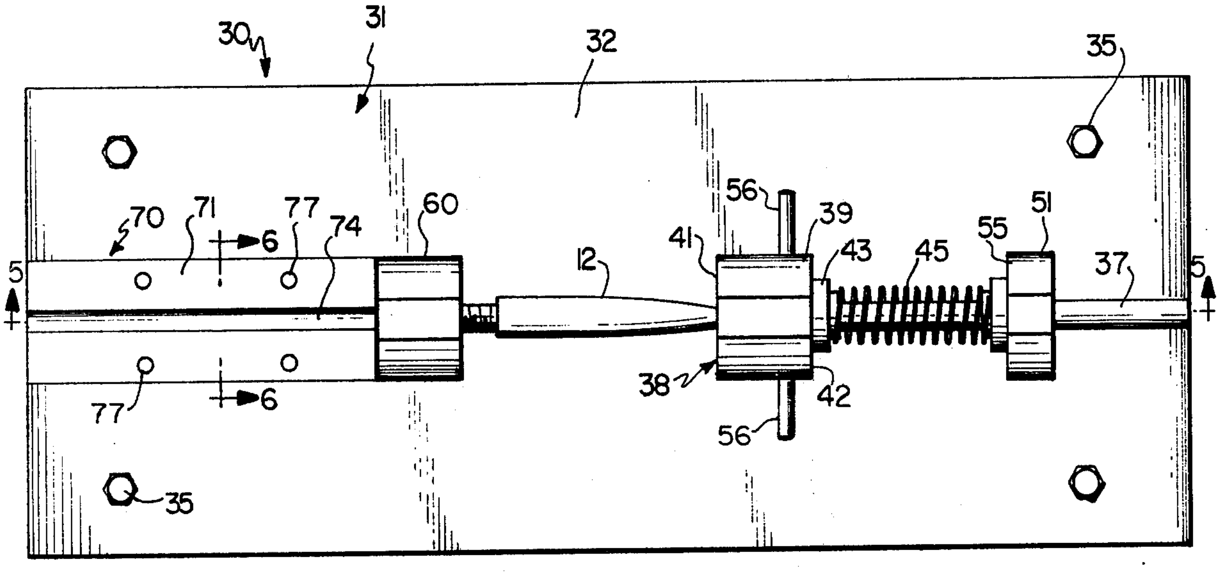
FIG. 3 is a top plan view thereof.
Figure 4:
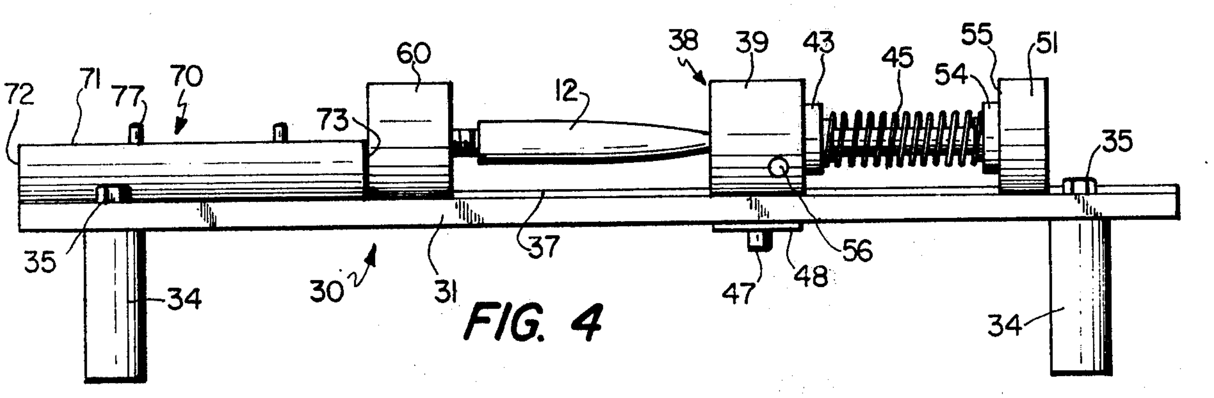
FIG. 4 is a side elevational view of FIG. 3.
Figure 5:
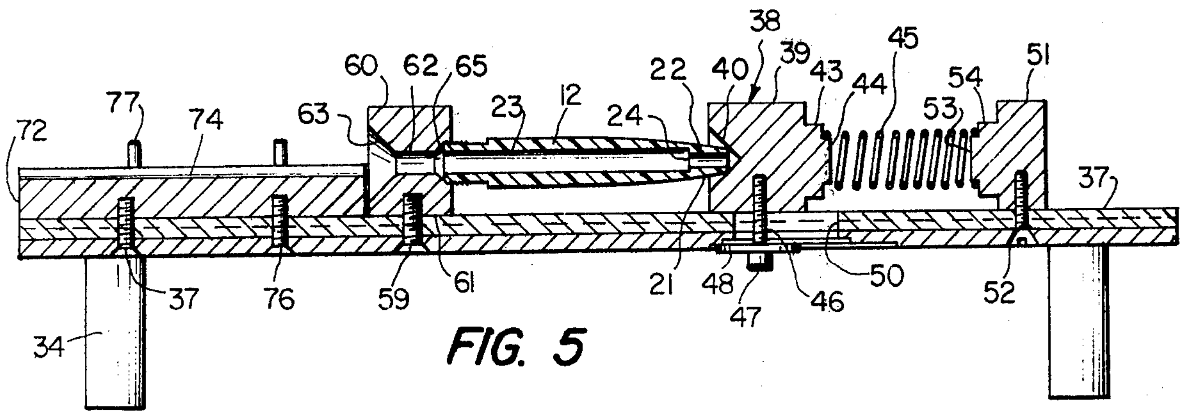
FIG. 5 is a section along the line 5—5 of FIG. 3.

An elongated generally cylindrical mandrel 80 is provided for inserting the rectangularly shaped and preprinted strip of material 18 into the hollow barrel of a writing implement which is positioned within the apparatus, as shown in FIGS. 3–5. A shoulder or wall 81 defines a reduced diameter nose or tip portion 82 of the mandrel. The tip portion 82 is of a first diameter which is less than the diameter of the bore 62 of the forming block 60 and the length of the tip portion 82 is generally equal to or slightly greater than the length of the strip of sheet material 18. Adjacent to the tip portion of the mandrel is a second generally cylindrical portion 83 which is of a diameter which is greater than the first or tip portion 82 and preferably equal to or slightly less than the diameter of the bore 62 of the forming block 60 so as to be complementary to the diameter of the semicircular groove 74 of the feed guide 70.

If desired, the mandrel may have a second shoulder or wall 84 which defines a third portion 85 having yet a greater diameter than the second portion 83. This third portion of the mandrel may be used as a handle for operatively supporting the mandrel during use and the second shoulder may serve as a positive stop means by engaging the feed guide assembly 70 and preventing further axial movement of the mandrel through the forming block 60 when in use.

In the operation of the device, a strip of sheet material is placed on the feed guide 70 between the pins 77 and the barrel 18 is clamped between the forming block 60 and the traveling block 39. The nose or tip portion of the mandrel is located above the strip and then a downward force is applied to cause the material strip to be settled into and conform to the shape of the generally U-shaped channel or groove 74. Thereafter, an axial force is applied to the mandrel as indicated by the arrow in FIG. 2.

As the axial force is applied, the first shoulder 81 of the mandrel engages the trailing edge or end of the strip of material and pushes the strip lengthwise into the frusto-conical opening of the forming block 60. The frusto-conical opening of the forming block causes the upwardly extending edges of the strip to curl or curve inwardly into a substantially abutting relationship with each other so as to form a generally tubular cylinder which is pushed through the bore of the forming block and into the barrel of the implement until such material abuts the shoulder 24. Afterward, the mandrel is removed and the display barrel released from its clamped position between the traveling and forming blocks.

As discussed previously, the strip of sheet material may be paper, flexible plastic, or the like which when coiled into a cylindrical shape will spring or urge itself outwardly to conform itself to the cylindrical shape of the barrel into which it is inserted. Due to the costs involved in both the material and the printing, paper is generally preferred for use with this invention. The paper which may either be precut or provided in larger sheets, is initially printed, colored, or otherwise provided with some design, phrase or other indicia. If the paper is not precut, it is cut after printing to the desired length and width so as to conform to the shape of the interior of the barrel of the pen or other implement into which the material is to be inserted.

I claim:

1. Apparatus for forming and inserting a strip of sheet material into a hollow member comprising, forming means having a tube forming portion, clamping means for urging the hollow member into an abutting relationship with said foaming means so as to be in axial alignment with said tube forming portion of said forming means, means for supporting a generally planar strip of sheet material adjacent to said forming means, said means for supporting a strip of sheet material having a U-shaped channel along the length thereof, said U-shaped channel being disposed in substantial axial alignment with said tube forming portion of said forming means, and mandrel means disposed substantially along the length of said planar strip of sheet material for urging said planar strip of sheet material into said U-shaped channel and for moving the sheet material from said support means through said tube forming portion to form the material into a generally tubular shape and thereafter inserting the tubular shaped material into the hollow member, whereby the relatively flat material is generally simultaneously formed into a tubular shape and inserted into the hollow member.

2. Apparatus for forming and inserting a strip of sheet material into a tubular light transmitting member comprising, forming means having a bore with a frusto-conical forming guide portion adjacent one end and a centering portion adjacent the other end, clamping means for releasably urging the tubular member against said centering portion of said forming means so as to be in substantially axial alignment with said bore of said forming means, said forming guide portion of said forming means being of a beveled configuration, a material feed guide means adjacent said forming guide portion of said forming means for supporting a generally planar strip of sheet material thereon, said feed guide means having an upper surface having a U-shaped channel formed therein, said U-shaped channel being substantially in axial alignment with said bore in said forming means and mandrel means disposed substantially along the length of said planar strip of sheet material for urging said planar strip of sheet material into said U-shaped channel and for urging the sheet material from said feed guide means into said forming guide means and through said bore to form the material into a generally cylindrical shape and thereafter pushing the cylindrically shaped material into the tubular member, whereby the relatively flat material is generally simultaneously formed into a cylindrical shape and inserted into the tubular member.

3. The invention of claim 2 in which said feed guide means has a generally planar upper surface with said U-shaped channel formed therein.

4. The invention of claim 3 in which said feed guide means includes upstanding material positioning means disposed on said upper surface and along both sides of said U-shaped channel for positioning the planar material on said upper surface of said feed guide means so that the longitudinal center line of the material is in substantial alignment over said channel.

5. The invention of claim 2 in which said strip of sheet material includes indicia on at least one side, said strip of material is of predetermined width, and the mouth of said forming guide portion is wider than the width of said strip of material.

6. The invention of claim 2 including a base, an elongated generally linear guide means disposed along and secured to said base, each of said feed guide means, forming means and clamping means being mounted in abutting relationship with said guide means so that said feed guide means, forming means, and clamping means are in linear relationship along said base.

7. The invention of claim 6 in which said clamping means is mounted for reciprocal movement along said guide means.

8. The structure of claim 2 in which said clamping means includes a reciprocating member engaging block having an opening therein which is aligned with said centering portion of said forming block and means for urging said clamping block toward said forming block.

9. The invention of claim 8 in which said means for urging said reciprocating clamping block includes spring means disposed between said clamping block and a stop block spaced therefrom.

10. The invention of claim 2 in which said centering portion of said forming means is a beveled recess and said clamping means includes a beveled recess therein, said beveled recesses of said forming means and said clamping means cooperating to automatically align the tubular member with said bore through said forming means when the tubular member is placed in a clamped engagement between said clamping means and said forming means.

11. Apparatus for forming and inserting a strip of sheet material into a tubular light transmitting member comprising, forming means having a bore with a frusto-conical forming guide portion adjacent one end and a centering portion adjacent the other end, clamping means for releasably supporting the tubular member against said centering portion of said forming means so as to be in substantially axial alignment with said bore of said forming means, said forming guide portion of said forming means being of a beveled configuration, a material feed guide means adjacent said forming guide portion of said forming means for supporting a generally planar strip of sheet material thereon, and mandrel means for urging the sheet material from said feed guide means into said forming guide means and through said bore to form the material into a generally cylindrical shape, said mandrel means including a first generally cylindrical portion defined by a first shoulder which connects said first portion to a second generally cylindrical portion, said second generally cylindrical portion having a diameter greater than said first generally cylindrical portion, each of said first and second generally cylindrical portions being of a size to pass through said bore of said forming means, whereby when said first generally cylindrical portion of said mandrel is forced downwardly against said feed guide means and said mandrel is moved axially through said forming means, said first shoulder means engaged the planar material so that said material is moved through said forming means and into the tubular member.

12. The invention of claim 11 in which said mandrel includes a second shoulder portion which connects said second generally cylindrical portion to a third portion, said second shoulder portion being spaced along said second generally cylindrical portion so as to positively engage said feed guide means to limit axial movement of said mandrel when said first generally cylindrical portion has passed through said forming means.

13. The method of inserting a strip of indicia bearing sheet material into the hollow barrel of a writing implement comprising the steps of: releasably clamping said barrel along a predetermined axis between a movable clamping member and a fixed forming member having a frusto-conical portion axially aligned along said predetermined axis, positioning the strip of generally planar sheet material on a feed guide means adjacent to said forming member so as to be in substantial axial alignment with said axis with the indicia bearing surface of the sheet material positioned in facing relationship with said feed guide means, initially depressing said strip of sheet material against said feed guide means to form a substantially elongated U-shaped configuration and subsequently moving said strip of material along said axis through said frusto-conical portion of said forming means to form said strip into a generally tubular configuration, and substantially simultaneously inserting said tubular strip into said hollow barrel.

* * * * *